United States Patent [19]

Newtson

[11] 3,964,134
[45] June 22, 1976

[54] GROCERY CART CLIP ATTACHMENT

[76] Inventor: Gary L. Newtson, 752 Robinhood Circle, Bloomfield Hills, Mich. 48013

[22] Filed: Mar. 10, 1975

[21] Appl. No.: 557,188

[52] U.S. Cl. .................... 24/81 PC; 24/81 PH; 280/33.99 A
[51] Int. Cl.² ................ A44B 21/00; B62D 39/00
[58] Field of Search .............. 280/47.26, 33.99 A, 280/150 R, DIG. 4; 40/17, 10 R; 24/81 R, 81 TA, 81 PA, 81 BA, 81 PC, 81 PH, 3 A, 3 L

[56] References Cited
UNITED STATES PATENTS

| 1,466,057 | 8/1923 | Mathews | 24/81 TA |
|---|---|---|---|
| 1,701,057 | 2/1929 | Thatcher | 24/3 A X |
| 1,815,024 | 7/1931 | Foster | 24/81 PC UX |
| 2,713,469 | 7/1955 | Wright | 24/81 PA X |
| 2,757,022 | 7/1956 | Young | 24/81 TA X |
| 3,019,954 | 2/1962 | Faltin | 24/81 BA X |
| 3,195,253 | 7/1965 | White | 24/81 PH X |
| 3,251,543 | 5/1966 | Bush et al. | 280/33.99 A X |
| 3,265,297 | 8/1966 | Behrens | 280/33.99 A X |
| 3,438,143 | 4/1969 | Wolfersberger | 40/17 X |
| 3,609,893 | 10/1971 | Routzahn et al. | 40/10 R |

FOREIGN PATENTS OR APPLICATIONS

| 1,030,824 | 3/1953 | France | 24/81 TA |

Primary Examiner—Donald A. Griffin

[57] ABSTRACT

A grocery cart attachment comprising a clip adapted to be removably applied to the side of the grocery cart. Retainers on the clip hold a grocery list pad to the clip, and a pencil holder on the clip is adapted to hold a pencil.

15 Claims, 5 Drawing Figures

GROCERY CART CLIP ATTACHMENT

BACKGROUND OF THE INVENTION

This invention relates to a wire cart attachment, and more particularly to a grocery cart attachment for holding a pad of paper and adapted to be slipped onto and off of a grocery cart by a shopper.

It is conventional practice for a shopper, such as a grocery shopper, to make up an item-needed list at home on a piece of paper, or on a pad of paper or the back of an envelope, for example. As the shopper selects the various items from the shelves of the store she usually checks off the item on her list. This procedure is often cumbersome and awkward due to various reasons, such as for example, the flexibility of the paper or the difficulty encountered in trying to make the pen or pencil mark the flexible paper, or the difficulty in simultaneously manipulating a sheet of paper and a pencil while picking the items selected from shelves. The shopper usually has to use the item or package just selected for a backing for the paper, or she uses her purse, or even her hand. In any event the shopper usually finds it difficult or at least a nuisance to keep her list and pencil or pen together while picking items off the shelves. These difficulties are not such that shopping is hindered to any great extent, but they are inconveniences. The purpose of this invention is to eliminate the stated difficulties and inconveniences.

BRIEF SUMMARY OF THE INVENTION

Briefly, this invention comprises a clip having legs which are adapted to releasably clamp onto the side of a grocery cart, the clip having means for securing a note pad on the clip, and means for retaining a writing implement.

One of the primary objects of this invention is to provide a grocery cart clip adapted to hold a pad of paper and a writing instrument, such as a pencil, the clip also being adapted to be conveniently applied to and removed from the edge of a grocery cart by a shopper.

Another object of this invention is to provide a clip of the class described which can be removably attached to almost every type of grocery cart manufactured and to either the right or left side of the cart.

A further object of this invention is to provide a clip, pad and pencil attachment of the type described which is small and may be conveniently carried in a woman's purse.

Still another object of this invention is to provide a clip of the class described which is formed of extruded plastic in one piece.

A further object of this invention is to provide a clip such as described which is economical in construction and effective in operation.

Other objects and advantages will be made apparent as the description progresses.

BRIEF DESCRIPTION OF THE DRAWINGS

In the accompanying drawings in which one of various possible embodiments of this invention is illustrated.

Like parts are indicated by corresponding reference characters throughout the drawings.

DESCRIPTION OF THE PREFERRED EMBODIMENT

Figure 1:
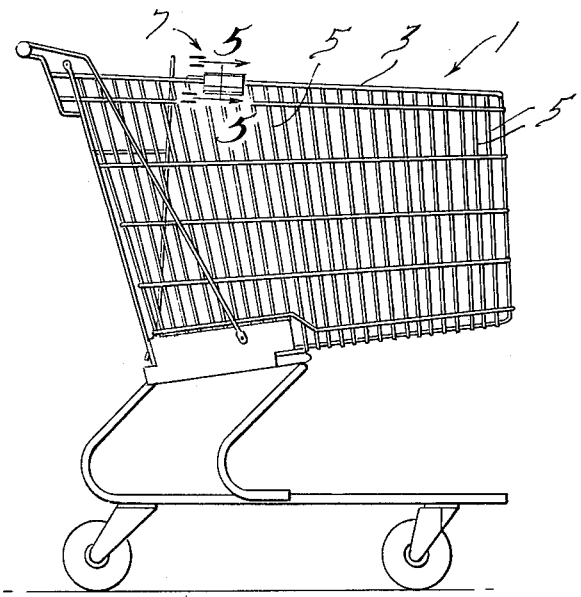
FIG. 1 is a side view in elevation of a typical grocery cart having an attachment of this invention mounted thereon.
Figure 2:
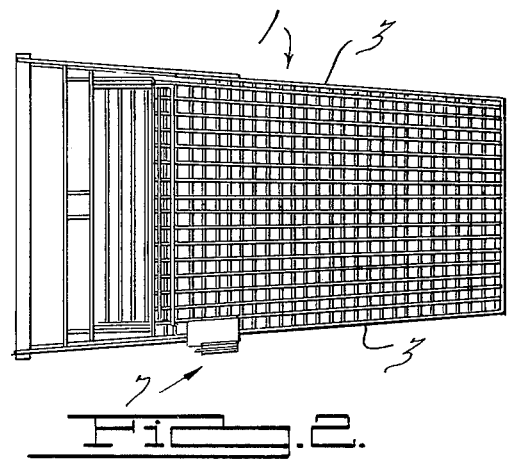
FIG. 2 is a plan view of FIG. 1.
Figure 3:
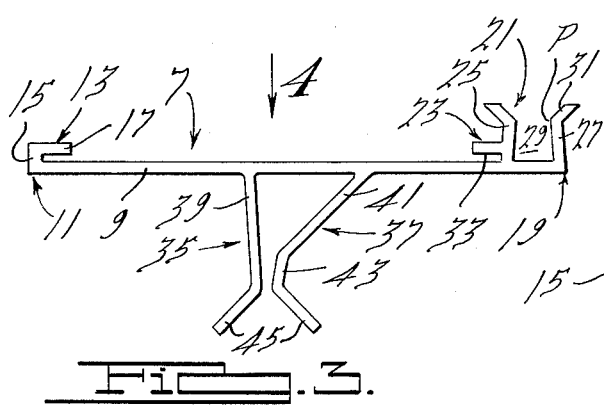
FIG. 3 is an enlarged end elevation of a clip of this invention.
Figure 4:
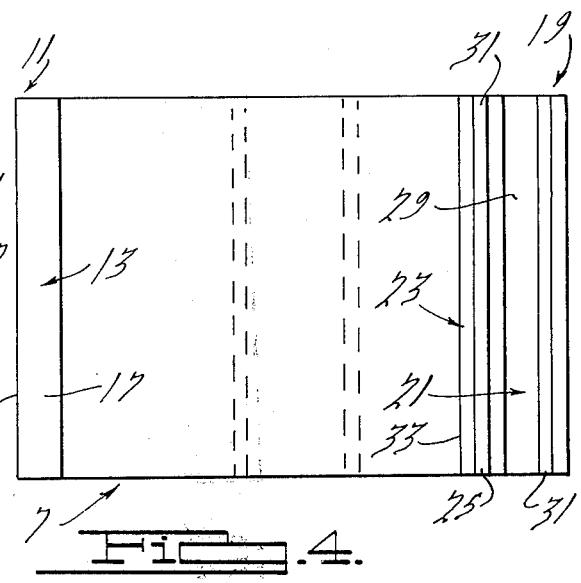
FIG. 4 is a plan view of FIG. 3.
Figure 5:
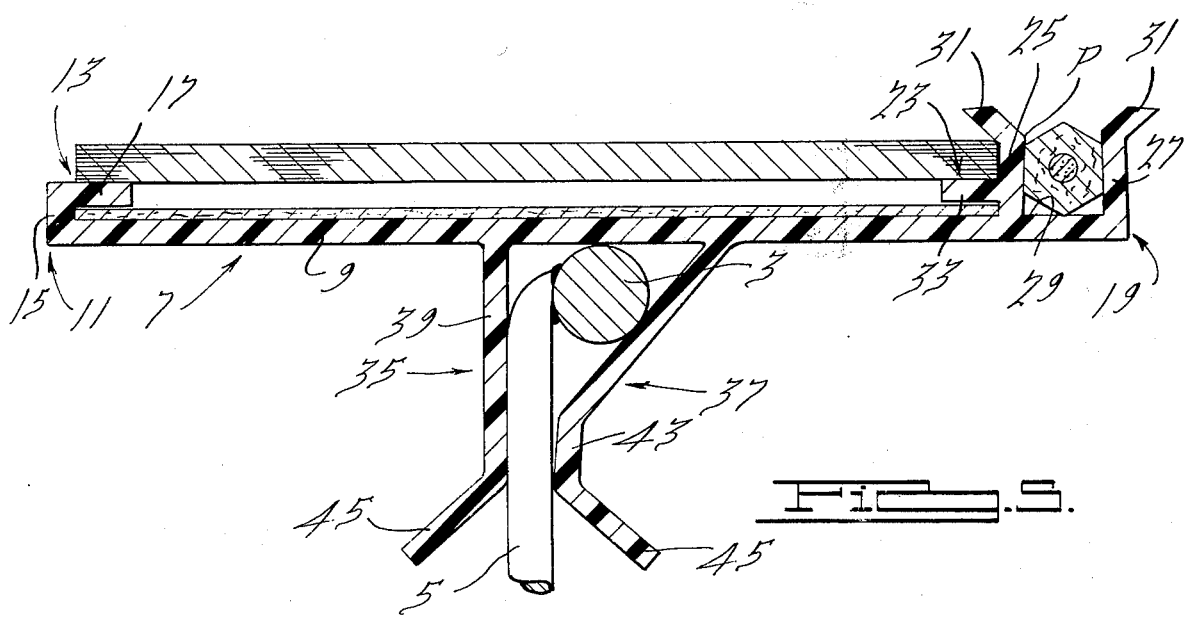
FIG. 5 is an enlarged sectional view taken along line 5—5 of FIG. 1.

Referring now to the drawings, an attachment of this invention, generally designated 1, is shown mounted on one of the many types of grocery carts. These carts vary widely as to the handle construction, i.e., in some carts the handles are located relatively close to the basket of the cart, while in other carts the handles are located a substantial distance behind and/or above the basket. The side supports for these handles vary from a single rod extending from the basket on each side thereof to the ends of the handle to multi-rod arrangements having various configurations. However, almost all grocery carts are similar in the construction of the baskets per se. The carts uniformly have a forwardly extending rod 3 constituting the top rim of the basket. A plurality of generally vertical or slightly inclined rods or stringers 5 extend downwardly from the rod 3. There is one particular variation in the basket construction of the carts produced by various manufacturers. As shown in FIG. 5 the stringers 5 at the upper ends thereof are usually connected to the inside of rod 3. However, a few cart manufacturers place the vertical rods on the outside of rod 3. While most of the cart manufacturers place the generally vertical rods on the inside of the top rim rod, the attachment of this invention will fit any cart with either of these types of basket construction.

Generally, the upper rim rods 3 are formed of No. 1 Washburn & Moen gauge rod having a diameter of approximately 0.283 inches. The generally vertical rods 5 are often constructed of No. 9 gauge having a nominal diameter of 0.1483 inches.

The clip is generally indicated at 7. It is formed of an extruded plastic material, such as extruded rigid vinyl. The clip has a flat form or base support section 9 which extends substantially the full width of the clip. The length of the base 9 and the clip is preferably sufficient to permit the clip to engage at least two vertical stringers 5 as will be made apparent. In this regard it has been found that a clip length of approximately 2.5 inches is sufficient.

Along one lengthwise edge 11 of the support or base 9 is an elongated retaining track 13 formed by a vertically extending portion or rib 15 and a wing or overlying portion 17 extending inwardly from the upper end of the rib 15. The space between the upper face of support 9 and the lower face of portion 17 is sufficient to accommodate chipboard backs of conventional note pads. In this regard, most chipboard backs for note pads are supplied to note pad makers in various thicknesses. For example, chipboard can be purchased with an 0.018 inch thickness or a 0.024 inch thickness, or a 0.035 inch thickness, or a 0.043 inch thickness, for example. While it is believed that providing a space of 0.033 plus or minus 0.010 inches is preferable for accepting most chipboard backs, there is enough flexibility in the retainer portion 17 and chipboard itself is compressible to accept chipboard backs of a greater thickness.

At the other lengthwise edge portion 19 of the support 9 there is a pencil or writing implement holder 21 and a retainer track or guide 23. The pencil holder 21 comprises two upstanding gripping walls 25 and 27 which form a pocket or trough 29 for receiving a pencil. Each wall is inclined toward the other from the base upwardly to a height sufficient to permit a conventional hexagonal pencil to be placed in the trough. Many hexagonal wood pencils, such as the type often used on golf courses, for example, have a thickness of approximately 0.275–0.280 inches. In this regard it has been found that if the distance between the walls 25 and 27 at point P is 0.260 ±0.010 inches, the resiliency of the walls will be sufficient to releasably clamp a conventional pencil inserted therein.

To facilitate the insertion of a pencil into the pocket 29 outwardly diverging lips 31 are formed along the upper edges of the walls above the point P.

The retaining track 23 is formed by a wing or overlying portion 33 extending inwardly from wall 25. The lower face of the portion 33 is spaced from the upper face of the base 9 the same as the portion 17 of retainer 13. The distance between the inner edge of rib 15 and wall 25 is preferably approximately 3.062 inches to permit the chipboard back of a note pad having a width of 3 inches to be readily slipped into the tracks 13 and 23, as will be made apparent, with the sheets of the pad overlying the portions 17 and 33.

Extending downwardly from the lower face of the base 9 are two clamping legs 35 and 37 which, since the clip is extruded, extend throughout the length of the clip. Leg 35 includes a stringer engaging wall portion 39 which extends downwardly from the base 9 toward the leg 37 at a slight angle with respect to a plane perpendicular to and extending lengthwise of the base. As will be made apparent, the lower end of the wall 39 is offset slightly from the upper end of the wall so that the wall can be cantilevered clockwise about its upper edge by the stringers of a grocery cart.

The clamping leg 37 includes a rim rod engaging wall portion 41 and a stringer engaging wall portion 43 extending downwardly from the lower edge of the wall portion 41. Wall portion 41 extends downwardly from the base at approximately a 45° angle therewith from a point approximately 0.6 inch from the midpoint between the ends of the tracks 13 and 23 to a point approximately 0.5 inch below the lower face of the base. This results in a generally triangular space being formed in which a grocery cart rim rod having a 0.283 diameter can be received.

The stringer wall portion 43 extends downwardly from the lower edge of the wall 41 approximately 0.25 inch and toward the lower edge of the wall 39. The distance between vertical planes passing through the lower edge of wall portion 41 and the upper edge of wall 39 is approximately 0.150 inch plus or minus normal tolerances. This distance will permit a stringer formed of No. 9 gauge wire (0.1483 inch nominal diameter) to be received therebetween.

The lower edge of stringer wall 43 is spaced from the lower edge of wall 35 approximately 0.073 inch plus or minus normal tolerances when the clip is not attached to a grocery cart. Diverging guiding lips 45 extend downwardly and at approximately 45° angles relative to a horizontal plane from the lower edges of the walls 39 and 43. The thickness of the various portions of the clip may vary but it has ben found that a thickness of 0.080 inch is believed satisfactory.

The clip is utilized in the following manner:

Assuming that upon first obtaining a clip, a 3 inch by 5 inch note pad having a conventional chipboard back, and a conventional hexagonal pencil, the purchaser or recipient wishes to assemble the same into a complete assembly. The back of the pad is inserted into the tracks 13 and 23 with the paper sheets of the pad overlying the retainers 17 and 33. The back may be slipped through the clip until the pad is in the position desired by the user. The pencil is pressed into the pencil holder 21 where it is retained by the resiliency of the walls 25 and 27.

The user, which will be assumed to be a female shopper, makes up her grocery list on the top sheet or sheets of the pad while the latter is in the clip or when it is removed therefrom. In any event the pad, attached to the clip, along with the pencil in the pencil holder 21, can be dropped in the user's purse.

Upon arriving at the store and obtaining a grocery cart, the user removes the assembly from her purse. Assuming the cart is of the conventional type having a top rim rod on the outside of the generally vertical stringers, and the shopper wants to place the attachment on the right-hand side of the cart, she places the diverging lips 45 over the rim rod and presses the clip downwardly. The lips 45 of the rim rod cause the legs 35 and 37 to be forced apart at the lower ends of the wall portions 39 and 43 so that the latter slip over the rod, with the wall 39 sliding down the inside of the stringers 5. As the wall portion 43 slips below the rim rod 3 the inherent stiffness of the wall portions 41 and 43 cause wall portion 43 to engage the outside of the same stringers engaged by wall portion 39 on the inside. The stringers, normally of a diameter greater than the normal unstressed spacing between the lower edges of walls 39 and 43, cause both walls to be forced outwardly from their unstressed position to a position in which both are more nearly vertical and engage the stringers with a line contact rather than a point contact.

If desired, the legs may be spread apart slightly during the application of the clip to the cart by squeezing the edges of the clip toward one another to bow the base slightly downwardly. This facilitates the application of the clip to the cart.

When the clip is pushed downwardly on the rim rod 3, the rod is cradled in the pocket formed by base 9 and inclined wall portion 41, as shown in FIG. 5. The clip is held in a position generally perpendicularly to the stringers 5 and parallel to the rim rod 3 by the engagement of the leg 35 with the stringers, and the engagement of the rim rod 3 with the lower surface of the base 9 and with the wall portion 41. Any pressure on the portion of the pad to the right of the rim rod 3 is opposed by the pressure applied to the outside of the stringers 5 by the wall portion 43, the pressure of the wall 35 on the inside of the stringers and the pressure of the lower surface of the base 9 on the upper surface of the rim rod. Any pressure on the portion of the pad to the left of the rim rod is opposed by the pressure applied to the inside of the stringers 5 by wall portion 39, the engagement of the lower side of the base 9 with the upper surface of the rim rod, and the wall portion 41 with the lower and outside area of the rim rod. This keeps the clip in a relatively stable condition on the cart.

The pencil can be removed and reapplied to the pencil holder with relative ease since the clamping force exerted by the legs 35 and 37 keeps the clip in place even though the pencil holder legs 25 and 27 may be flexed.

The shopper next proceeds through the store selecting items on her list. As each item is selected she crosses the item off her list. After selecting all of the items she proceeds to the check-out counter or station. At this point she grasps the opposite side edges of the clip and lifts upwardly. If desired, she may also bow the base as she lifts the clip upwardly. The legs 35 and 37 are spread apart by the camming effect of the rim rod. The shopper then places the clip in her purse for further use.

It will be understood that if the shopper desires to place the clip on the left side of the cart the pad is removed from the tracks, rotated 180° and then reinserted in the tracks. The clip is then applied and used in the same manner as described above.

If the grocery cart is the type in which the rim rod is on the inside of the stringers, the clip is applied in substantially the same manner, except the pencil holder 21 is on the inside of the clip and the cart instead of the outside. For example, FIG. 5 would show the relative location of the parts if it were a section taken on the left side of the cart rather than on the right side.

When the pad is depleted a standard 3 inches by 5 inches pad or any pad 3 inches wide may be used as a replacement. In this regard shopping pads having dimensions of 3 inches by 7 or 8 inches are available as rack items in many grocery supermarkets. The present clip will readily accept such pads.

While slight variations in grocery cart rod dimensions often occur, the clip will readily fit over the parts involved. Obviously tolerances and variations in dimensions will allow some play in the clip after attachment, but such play is minimal and quite tolerable.

In view of the foregoing it will be seen that the several objects and advantages of this invention are achieved. For example, the clip may be easily applied to and removed from a grocery cart. It may also be applied to either the right or left side, and further, is adapted to fit almost all known grocery carts with very little slippage. It also may be extruded and is relatively small.

Although only one embodiment of the invention has been disclosed and described, it is apparent that other embodiments and modifications of the invention are possible.

I claim:

1. A clip adapted to be removably attached to a grocery cart of the type having an upper rim rod extending along the side of the cart and a plurality of wire members attached to said rim rod and extending downwardly therefrom, said clip comprising a base, paper pad retaining means for holding a paper pad having a cardboard backing and a plurality of sheets connected to said backing on said base, and attaching means extending downwardly from said base, said attaching means comprising a pair of legs, said legs being adapted to be spread apart to be slipped over said rim rod and engage said wire members for removably attaching said clip to said cart, said legs when engaging said wire members, maintaining said clip in a substantially stable position on said rim rod.

2. A clip as set forth in claim 1 wherein said legs have wire member engaging portions adapted to engage said wire members, one of said legs having a pocket portion between its wire member engaging portion and said base for receiving said rim rod when said legs are slipped over said rod.

3. A clip as set forth in claim 2 wherein the upper end of said pocket portion of said one leg adjacent said base is offset from the lower end of said pocket forming portion by a distance at least equal to approximately the diameter of said rim rod.

4. A clip as set forth in claim 1 wherein said legs have a length equal to at least the distance between two adjacent wire members, said legs having diverging lips at the lower ends thereof for facilitating the spreading of said wire member engaging portions.

5. A clip as set forth in claim 1, said pad holding means including flanges spaced upwardly from said base, said flanges forming slots open at their inner ends to receive said backing of said pad of paper.

6. A clip as set forth in claim 1 further including writing implement holding means extending from said base, said writing implement holding means including two legs spaced apart from one another, said legs of said writing implement holding means having diverging lips at the outer end thereof for facilitating the insertion of a writing implement between said legs of said writing implement holding means.

7. A clip as set forth in claim 6 wherein said legs of said writing implement holding means are inclined toward one another from said base toward said lips of said writing implement holding means.

8. A clip as set forth in claim 6 wherein said legs have wire member engaging portions adapted to engage said wire members, one of said legs having a pocket portion between its wire member engaging portion and said base for receiving said rim rod when said legs are slipped over said rod, the lower end of said wire engaging portion of the other leg extending downwardly from said base and being offset from the upper end of said other leg only a slight amount toward said one leg.

9. A clip as set forth in claim 8 wherein the upper end of said pocket portion of said one leg adjacent said base is offset from the lower end of said pocket forming portion by a distance at least equal to approximately the diameter of said rim rod.

10. A clip adapted to be removably attached to a grocery cart of the type having an upper rim rod and a plurality of wire members attached thereto and extending downwardly therefrom, said clip comprising a base, paper pad retaining means on said base for holding a clipboard backed pad of paper on the upper side thereof, a pair of legs extending downwardly from a central portion of said base, said legs having wire member engaging portions thereof spaced downwardly from said base, one of said legs having a pocket forming portion above its wire member engaging portion for receiving said rim rod, said wire member engaging portions of said legs normally being spaced apart by a distance less than the thickness of said rim rod, said base and legs being resilient to permit said wire member engaging portions of said legs to be slipped over said rim rod and engage said wire members with said rim rod being in the pocket formed by said pocket forming portion of said one leg.

11. A clip as set forth in claim 10 wherein said legs have a length equal to at least the distance between two adjacent wire members, said legs having diverging lips at the lower ends thereof for facilitating the spreading of said wire member engaging portions.

12. A clip as set forth in claim 10 wherein the lower end of said wire member engaging portion of the other leg extending downwardly from said base is offset from the upper end of said other leg only a slight amount toward said one leg.

13. A clip as set forth in claim 12 wherein said legs have a length equal to at least the distance between two adjacent wire members, said legs having diverging lips at the lower ends thereof for facilitating the spreading of said wire engaging portions.

14. A clip as set forth in claim 13 wherein said pad retaining means comprising a pad holding means includes flanges spaced upwardly from said base, said flanges forming slots open at their inner ends to receive the backing of a pad of paper comprising a plurality of sheets connected to said backing.

15. A clip as set forth in claim 14 wherein said flanges extend a sufficient distance towards each other to provide a support for the edges of said sheets, said clip further including writing implement holding means extending from said base, said writing implement holding means including two legs spaced apart from one another, one of said legs of said implement holding means being formed integrally with one of said flanges, said legs of said writing implement holding means having diverging lips at the upper end thereof for facilitating the insertion of a writing implement between said legs of said writing implement holding means, one of said lips forming with an adjacent flange a pocket to accomodate one edge of said plurality of sheets supported by said flanges.

* * * * *

UNITED STATES PATENT AND TRADEMARK OFFICE
CERTIFICATE OF CORRECTION

PATENT NO. : 3,964,134
DATED : June 22, 1976
INVENTOR(S) : Gary L. Newtson

It is certified that error appears in the above-identified patent and that said Letters Patent are hereby corrected as shown below:

Column 6, line 45, delete "clipboard" and insert -cardboard-

Signed and Sealed this

Twenty-eighth Day of September 1976

[SEAL]

Attest:

RUTH C. MASON
Attesting Officer

C. MARSHALL DANN
Commissioner of Patents and Trademarks